A. C. BURRAGE, Jr., AND G. MEISEL.
SULFUR BLACK.
APPLICATION FILED DEC. 4, 1920.
1,383,072.
Patented June 28, 1921.
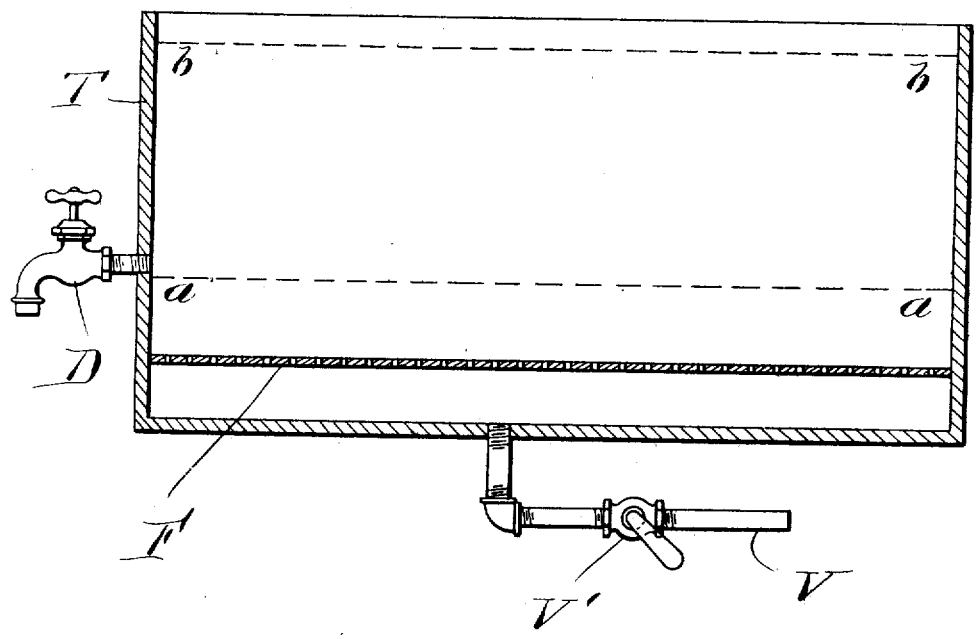
Inventors:
Albert C. Burrage
Guido Meisel
by Roberts Roberts Cushman
attys.

UNITED STATES PATENT OFFICE.

ALBERT C. BURRAGE, JR., OF HAMILTON, AND GUIDO MEISEL, OF BURRAGE, MASSACHUSETTS, ASSIGNORS TO ATLANTIC DYESTUFF COMPANY, OF BURRAGE, MASSACHUSETTS, A CORPORATION OF MASSACHUSETTS.

SULFUR-BLACK.

1,383,072.  Specification of Letters Patent.  Patented June 28, 1921.

Original application filed August 17, 1920, Serial No. 404,191. Divided and this application filed December 4, 1920. Serial No. 428,275.

*To all whom it may concern:*

Be it known that we, ALBERT C. BURRAGE, Jr., and GUIDO MEISEL, citizens of the United States and Germany, respectively, and residents, respectively, of Hamilton, in the county of Essex, and Burrage, in the county of Plymouth, both in the State of Massachusetts, have invented new and useful Improvements in Sulfur-Black, of which the following is a specification.

This invention relates to the manufacture of sulfur-black, and consists of a new composition of the solid color with water, or with water and a modifier or strength standardizer. The object is to provide users of sulfur-black with a material having such physical characteristics that it is readily susceptible to standardization to type or sample by means of a soluble solid modifier, not liable to deterioration by oxidation, uniform in quality and consistency, easy to manipulate in the dye-house, and readily and thoroughly soluble.

Heretofore, sulfur-black has been supplied to users either as a thick paste with water, or as a powder. In the wet state or paste, the sulfur-black can be and has been standardized to sample by the addition of more or less water to the paste or mud left as a residue of filtration; in the dry state it has been the practice to mix a soluble salt in dry comminuted condition, with the sulfur-black which has been wholly deprived of moisture in a vacuum drier. The solid modifier, *e. g.*, common salt, when mixed in sufficient quantity with the dry sulfur-black—say 20% of modifier to 80% sulfur-black, serves to restrain deterioration by oxidation as well as to bring the solid color to a prescribed standard of strength.

The wet color, while guarded against oxidation by the water with which it forms a paste, is not wholly satisfactory, particularly because the solid color settles in the containers and leaves watery regions; the paste must be thoroughly stirred in order to bring it to a solubly close approximation to uniform consistency. The vacuum dried color suffers some deterioration by oxidation during the drying, and is liable to further oxidation afterward. Oxidation not only reduces the color in quantity but leaves insoluble particles which are detrimental to the dyeing process. The dry color, moreover, does not go into solution as readily as the wet color.

The invention nerein described and claimed consists of a sulfur-black which possesses the advantages of both the wet and dry color heretofore furnished to users, and has the disadvantages of neither. A method by which this improved sulfur-black may be produced is described and claimed in our application for United States Letters Patent, Serial No. 404,191, and is as follows:

In the drawing hereto annexed there is represented, in vertical section, a sedimentation and filtration tank by means of which the process to be described may be carried out. This process is characterized; first: by filtration of the water in which the solid color is suspended, as it comes from the aeration tank, followed by partial evaporation of water which, being adherent to the color particles, is not capable of removal by filtration or drainage, this evaporation being controlled so that there remains in association with the sulfur black enough water to guard against oxidation, yet so little that the solid color is practically in powder as distinguished from a pasty or clayey consistency, is friable, and easily crushed from the lump into a loose, and slightly moist powder. Second: by a quiet sedimentation of the solid color from its water of suspension upon the filter bed of the filtering tank preceding or during drainage or filtration of water from the solid color through the filter bed; followed by such filtration, and after drainage of water from the solid, by partial air-drying as above prescribed. Third: by sedimentation of the solid color on the filter bed until there is a clearly defined surface of demarcation between the sediment and the superincumbent water, decantation of the superincumbent water from above the sediment, followed by filtration and partial air-drying, as before prescribed. Fourth: by settling only, no filtering.

While the product herein described and claimed may be divided from the method having only the first characteristic or having the first and second; experience indicates that the best mode is to practise the process in all their characteristics above stated. This process is as follows:

We run the hot solution with the color suspended in it from the aeration tank into a tank such as is indicated by T in the drawing. This tank has a filter cloth at F, and a vacuum or suction pipe V, which, when the color-liquid is run into the tank T is closed, as by a valve V'. The level of the liquor is at b—b. The color and liquor is allowed to stand quiet until the solid color has gently settled to the lower part of the tank, showing a distinct surface of demarcation or separation from the superincumbent liquid. Primarily, gentle sedimentation is the characteristic of this step in the process of separation of the solid color from the water of suspension; secondarily, continuation of sedimentation until the upper part of the liquid is practically clear, is important from the point of economy and certainty of result.

When the solid color has settled, showing the plane of separation, as at a—a, the liquid between level a—a and level b—b, or most of it, is decanted from the tank T, as by means of a tap D. Thus a large part of the liquid is removed without having to be drained through the solid color and the filter cloth.

Then the valve V' is opened, and vacuum filtration draws the greater part of the water remaining in the tank T through the filter cloth and out of association with the solid color. Preceding the forced filtration by a period of quiet sedimentation has the result of rendering the solid color capable of so freely permitting the final percolation of liquid that its removal by filtration is accomplished in a relatively short time.

We believe that this result is due to a classified stratification of solid particles of different sizes; that larger particles, during the period of quiet sedimentation, settle to the lower levels and rest on the filter cloth, leaving the finer particles to settle on them and on each other substantially graded from bottom to top in reverse order of bulk. We believe, further, that this classification of particles prevents the smallest solid bodies from sliming the filter cloth, and enables the liquid to percolate freely through the solid color as well as through the filter cloth.

Removal of a large proportion of the liquid by decantation, as above described, eliminates the necessity for drawing all the liquid through the solid color, and thus reduces the liability of disturbing the conditions which favor free percolation.

Forced filtration, as by suction, draws from the solid color substantially all the water except that which is adherent in capillary films to the particles of solid color. When the water removable by filtration has drained away through the filter bed, the vacuum "breaks," since air is drawn quite freely through the interstitial voids between the solid particles. The suction is maintained for a few minutes after the vacuum has thus been relieved, so as to draw in through the solid residue on the filter bed, and thus remove part of the water adhering to the solids, by evaporation. The extent or duration of this evaporation period is best determined by physical examination of the solid color shortly after the vacuum beneath the filter bed has broken; when the color crushes to a moist powder between the fingers, the evaporation has proceeded far enough, and the suction is then shut off, and the color removed from the filtration tank.

The above described method will be satisfactorily carried out, and the moist powder product obtained, with a charge from the aeration tank three and one half feet deep over the filter bed of the sedimentation and filtration tank, by allowing two to three hours for quiet sedimentation, and one to two hours for vacuum filtration, with pressure in the suction pipe at twenty-six inches below atmosphere, before the suction breaks.

The moist powder product, containing water in association with the solid color in quantity which guards against or materially obstructs deterioration by oxidation (which takes place to an undesirable degree when the color is dry) but in quantity small enough to preserve the practically loose and powdery condition of the color, is readily soluble for the dyer's purposes, and mixes easily and intimately with a standardizing material such as common salt.

We claim:

1. Sulfur-black associated with water and a solid soluble comminuted modifier uniformly distributed through it.

2. Sulfur-black containing water distributed through the solid color in quantity consistent with uniform mixture of a solid soluble comminuted modifier with the color.

3. Sulfur-black associated with water and solid comminuted salt uniformly distributed through it.

Signed by us at Boston, Massachusetts, this second day of December, 1920.

ALBERT C. BURRAGE, Jr.
GUIDO MEISEL.